United States Patent
Allen-Ware et al.

(10) Patent No.: US 9,568,986 B2
(45) Date of Patent: Feb. 14, 2017

(54) SYSTEM-WIDE POWER CONSERVATION USING MEMORY CACHE

(71) Applicant: International Business Machines Corporation, Armonk, NY (US)

(72) Inventors: Malcolm S. Allen-Ware, Austin, TX (US); John Steven Dodson, Austin, TX (US); Jordan Ross Keuseman, Rockester, MN (US); Karthick Rajamani, Austin, TX (US); Srinivasan Ramani, Cary, NC (US); Todd Jon Rosedahl, Zumbrota, MN (US); Gregory Scott Still, Raleigh, NC (US); Kenneth L. Wright, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 642 days.

(21) Appl. No.: 14/036,151

(22) Filed: Sep. 25, 2013

(65) Prior Publication Data

US 2015/0089263 A1    Mar. 26, 2015

(51) Int. Cl.
G06F 12/00    (2006.01)
G06F 1/32    (2006.01)
G06F 12/08    (2016.01)

(52) U.S. Cl.
CPC .......... *G06F 1/3275* (2013.01); *G06F 1/3225* (2013.01); *G06F 12/0835* (2013.01);
(Continued)

(58) Field of Classification Search
CPC .. G06F 1/3275; G06F 1/3225; G06F 12/0835; G06F 12/0897; G06F 2212/1025; Y02B 60/1228; Y02B 60/1225
(Continued)

(56) References Cited

U.S. PATENT DOCUMENTS 6,105,141 A    8/2000    Hanlon et al.
6,845,457 B1    1/2005    Mirov et al.
(Continued)

FOREIGN PATENT DOCUMENTS

JP    2012068740 A    4/2012

OTHER PUBLICATIONS

Bocchino, T. A. Posner, J. & Santiago, J.M . et al. (1996). Power Managed Second—Level Cache Control, IBM Technical Disclosure Bulletin, 39(4), 79-82, Doi: IPCOM000117595D: See pp. 79 & 82.

(Continued)

*Primary Examiner* — Matthew Bradley
(74) *Attorney, Agent, or Firm* — Garg Law Firm, PLLC; Rakesh Garg; William J. Stock

(57) ABSTRACT

A method, system, and computer program product for system-wide power conservation using memory cache are provided. A memory access request is received at a location in a memory architecture where processing the memory access request has to use a last level of cache before reaching a memory device holding a requested data. Using a memory controller, the memory access request is caused to wait, omitting adding the memory access request to a queue of existing memory access requests accepted for processing using the last level of cache. All the existing memory access requests in the queue are processed using the last level of cache. The last level of cache is purged to the memory device. The memory access request is processed using an alternative path to the memory device that avoids the last level of cache. A cache device used as the last level of cache is powered down.

19 Claims, 5 Drawing Sheets

(52) U.S. Cl.
CPC .. *G06F 12/0897* (2013.01); *G06F 2212/1028* (2013.01); *Y02B 60/1225* (2013.01); *Y02B 60/1228* (2013.01)

(58) Field of Classification Search
USPC ........................................................ 711/140
See application file for complete search history.

(56) References Cited

U.S. PATENT DOCUMENTS

| | | |
|---|---|---|
| 7,257,678 B2 | 8/2007 | Golden et al. |
| 7,266,641 B2 | 9/2007 | Kamei et al. |
| 7,272,732 B2 | 9/2007 | Farkas et al. |
| 7,412,570 B2* | 8/2008 | Moll .................. G06F 12/0835 711/118 |
| 7,644,225 B2* | 1/2010 | Dover ................. G11C 11/5628 365/185.03 |
| 8,140,764 B2 | 3/2012 | Shen et al. |
| 2012/0173907 A1 | 7/2012 | Moses et al. |

OTHER PUBLICATIONS

Miyahira, T. Nakao, A. & Shimotono, S. (1996). Method to reduce power consumption of L1 and L2 Cache, IBM Technical Disclosure Bulletin, 39(2).139-142, Doi: IPCOM000117357D: See p. 140.

* cited by examiner

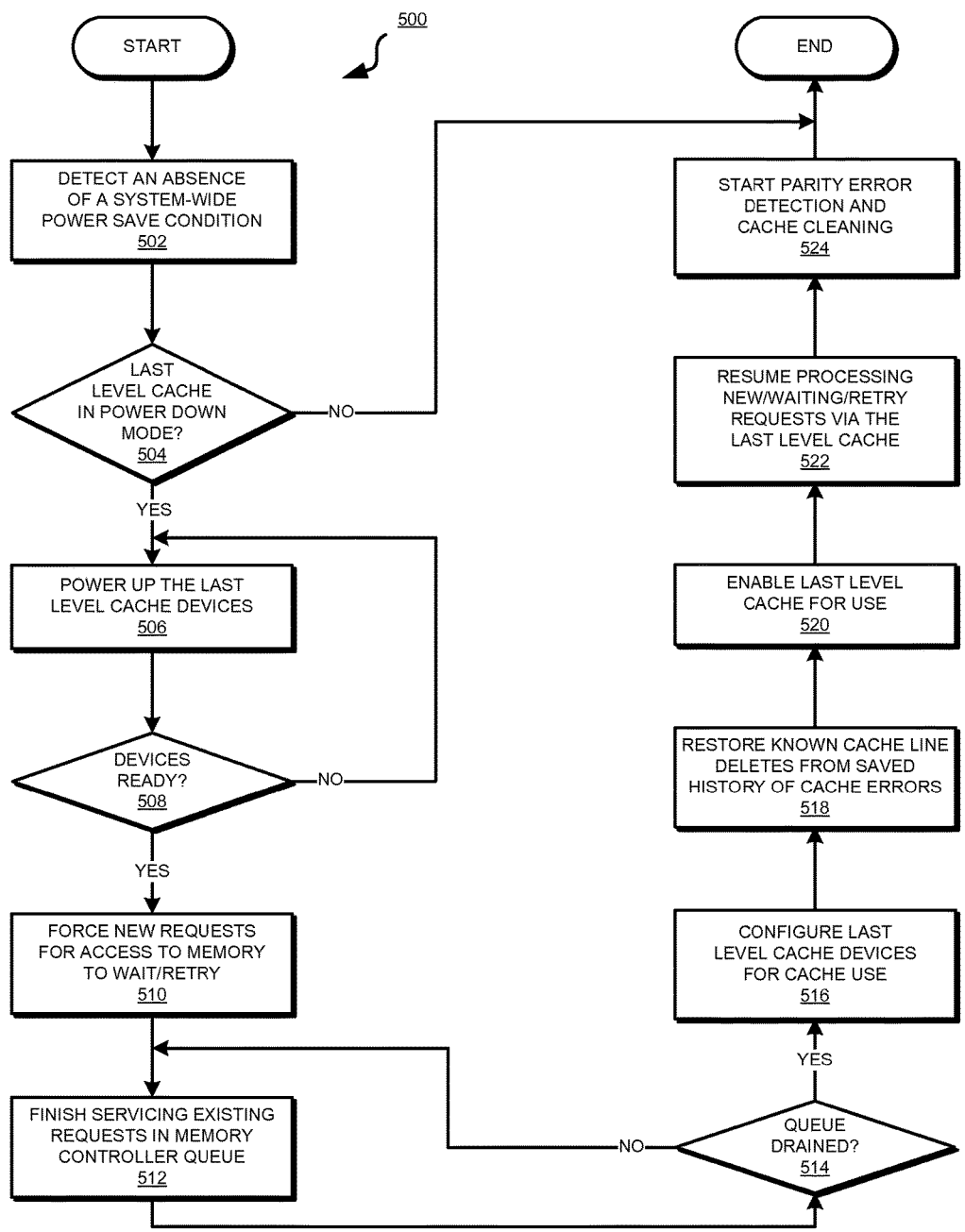

SYSTEM-WIDE POWER CONSERVATION USING MEMORY CACHE

BACKGROUND

1. Technical Field

The present invention relates generally to a method, system, and computer program product for managing the use of electrical power in a data processing environment. More particularly, the present invention relates to a method, system, and computer program product for system-wide power conservation using memory cache.

2. Description of the Related Art

Memory in a data processing system includes one or more solid-state memory devices, such as a Dual Inline Memory Module (DIMM). Not only the processors or processing cores, but also many other components and subsystems in the data processing system need access to the memory.

Access to the memory in a direct way is slower than acceptable in most cases. A cache memory (cache) is a faster but smaller memory device used for speeding up access to the most used or recently used data from the memory.

Various types of caches are presently in use. A particular type of cache is configured and located in a certain way depending on the nature of the use expected from that cache. For example, certain caches, such as level-1 (L1), level-2 (L2), and level-3 (L3) caches known as CPU-caches, and are used by processors for reading and writing data during instruction execution. L1, L2, and L3 caches are fast but small memory devices, typically formed on the same chip as the processor core for fast operation in close proximity to the processor.

Other levels of caches are not exclusively for use by the processor only. For example, a level-4 (L4) cache is a cache that is accessible to any subsystem in a data processing system, and any subsystem can read or write the memory via L4 cache. As with other caches, L4 cache includes faster devices but of smaller capacity as compared to the memory, and expedites access to recently used or frequently used data in the memory. As an example, a networking subsystem, e.g., comprising a network adapter, or an input/output (I/O) subsystem, e.g., comprising an I/O controller, or a partition management subsystem, e.g., in a multi-partitioned data processing system, can each access the memory via an L4 cache in a given configuration.

Electronic components, including memory devices used for main memory or cache memory, consume electrical power. A system-wide power saving condition is a condition that indicates that the power consumption of the data processing system as a whole has to be reduced.

SUMMARY

The illustrative embodiments provide a method, system, and computer program product for system-wide power conservation using memory cache. An embodiment receives a memory access request at a location in a memory architecture of a data processing system where processing the memory access request has to use a last level of cache before reaching a memory device holding a requested data. The embodiment causes, using a memory controller, the memory access request to wait, and omitting adding the memory access request to a queue of existing memory access requests accepted for processing using the last level of cache. The embodiment processes all the existing memory access requests in the queue using the last level of cache. The embodiment purges the last level of cache to the memory device. The embodiment processes the memory access request using an alternative path to the memory device that avoids the last level of cache. The embodiment powers down a cache device used as the last level of cache.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

FIG. 5 depicts a flowchart of an example process of returning a powered-down last level cache back to service in accordance with an illustrative embodiment.

DETAILED DESCRIPTION

Figure 1:
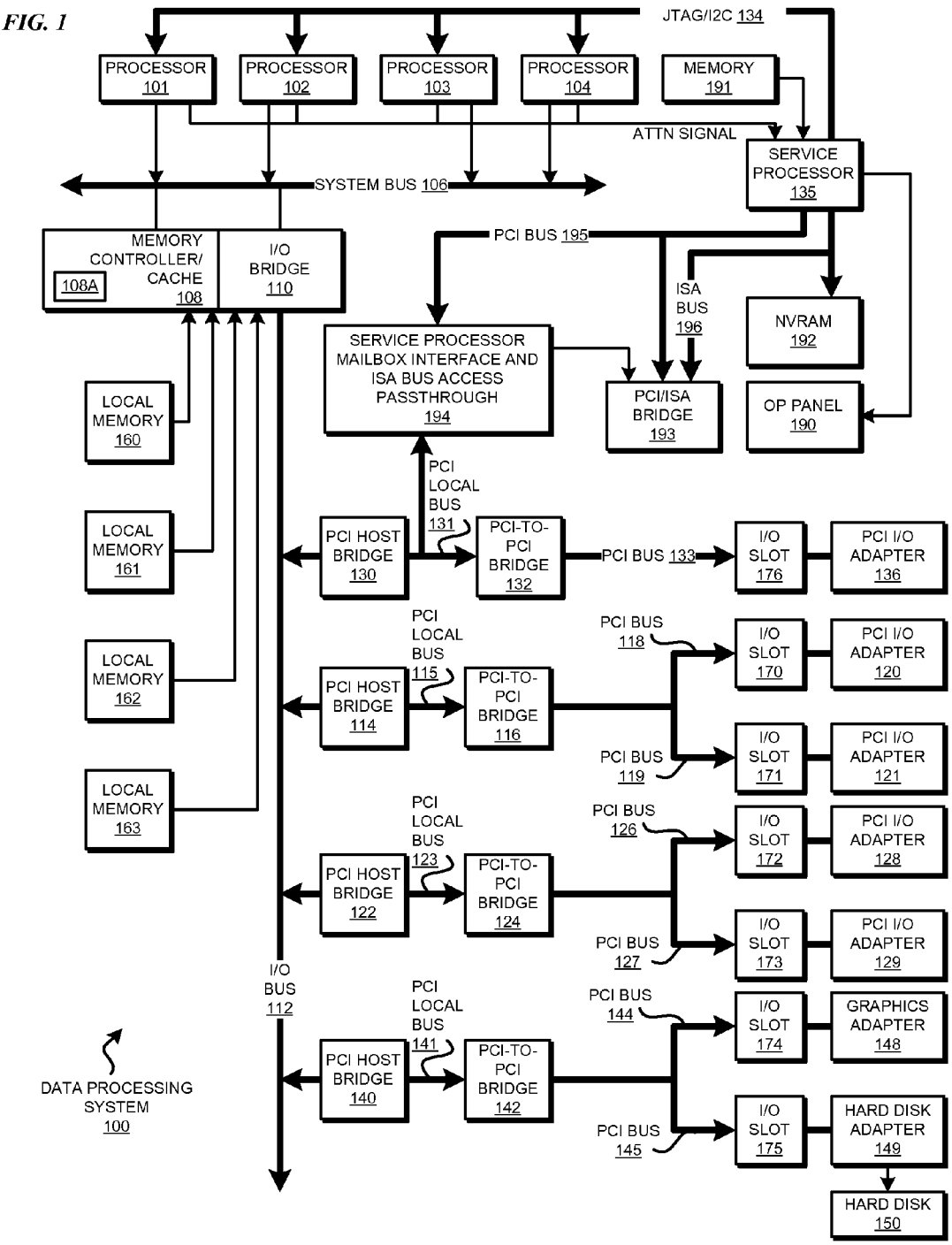
FIG. 1 depicts a block diagram of a network of data processing systems in which illustrative embodiments may be implemented.

Within the scope of the disclosure, a last level cache is a cache that immediately precedes the memory. In other words, any number of caches can exist in a data path between a subsystem needing memory access and the last level cache, but no other cache exists between the last level cache and the memory.

As with other caches, the last level cache according to the illustrative embodiments comprises devices that are faster than the devices used in the memory. Typically, but not necessarily, the last level cache is of a smaller capacity than the memory.

Without implying a limitation thereto, L4 cache preceding the main memory in a presently available data processing system is an example of the last level cache. With the advent of newer or different memory architectures, additional or different cache levels are going to become possible. Accordingly, the last level cache may be further removed from the subsystems, such as to a fifth, sixth, or later cache levels as may be practicable for the last level of cache before the memory is reached.

The illustrative embodiments recognize that different components consume power in different ways. For example, a processor consumes more than a threshold amount of power when the processor utilization is high, such as above a threshold level of utilization, and less power when the processor is idle, such as when the processor utilization is below the threshold level of utilization. Correspondingly, CPU caches use more than a threshold amount of power when the processor utilization is high, and less power when the processor utilization is low.

The illustrative embodiments recognize that power consumption of certain components is not tied to processor utilization in such a straight-forward manner. For example, even when a processor is idling in a below threshold utilization state, the last level cache, such as the L4 cache in a presently available data processing system, can experience high power consumption. For example, under certain circumstances, one or all processor cores in a data processing system may be in an idle state but the networking subsystem in the data processing system may be pushing significant amounts of data, resulting in significant L4 cache activity, and therefore, higher than threshold power consumption in the last level cache.

The illustrative embodiments recognize that normal power saving techniques are unsuitable for incorporating the last level caches in any power saving model. For example, normally a component can be powered down to eliminate or lower the power consumption of the component and thereby conserve power. However, by powering down a component, the functionality provided by the component in the data processing system is also lost. In case of components other than the last level cache, loss of the functionality is not an issue because the component is not being utilized anyway.

The illustrative embodiments recognize that due to the position occupied by the last level cache, a simple power down of the last level cache to conserve power disrupts memory access for many if not all subsystems in a data processing system. Such memory disruption would be unacceptable if the data processing system has to remain operational albeit in a reduced power consumption state.

The illustrative embodiments used to describe the invention generally address and solve the above-described problems and other problems related to power conservation in data processing systems. The illustrative embodiments provide a method, system, and computer program product for system-wide power conservation using memory cache.

An illustrative embodiment recognizes that a system-wide need for power reduction can arise regardless of the utilization of a component or the entire system. For example, in the event of a failure of one or more of multiple power supply units, the power consumption of the data processing system has to be reduced to maintain stability in the data processing system while using a reduced amount of power from the remaining power supply units.

As another example, a specification or a standard may require that the power consumption of the data processing system as a whole not exceed certain thresholds in certain corresponding states of operation. To bring the system in compliance with the specification or standard, the power consumption of the system may have to be reduced regardless of the utilization of any particular subsystem, such as the processor.

The illustrative embodiments recognize that options for reducing the power consumption in a system-wide power reduction condition are limited, and often cannot be achieved without shutting down components and suffering the corresponding loss of functionality. The illustrative embodiments recognize that the last level cache can be powered down in a manner described here that is not disruptive of the functionality, to wit, access to the memory, while reducing the total power footprint of the system.

The illustrative embodiments are described with respect to certain conditions, data processing systems, environments, components, and applications only as examples. Any specific manifestations of such artifacts are not intended to be limiting to the invention. Any suitable manifestation of the conditions, data processing systems, environments, components, and applications can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
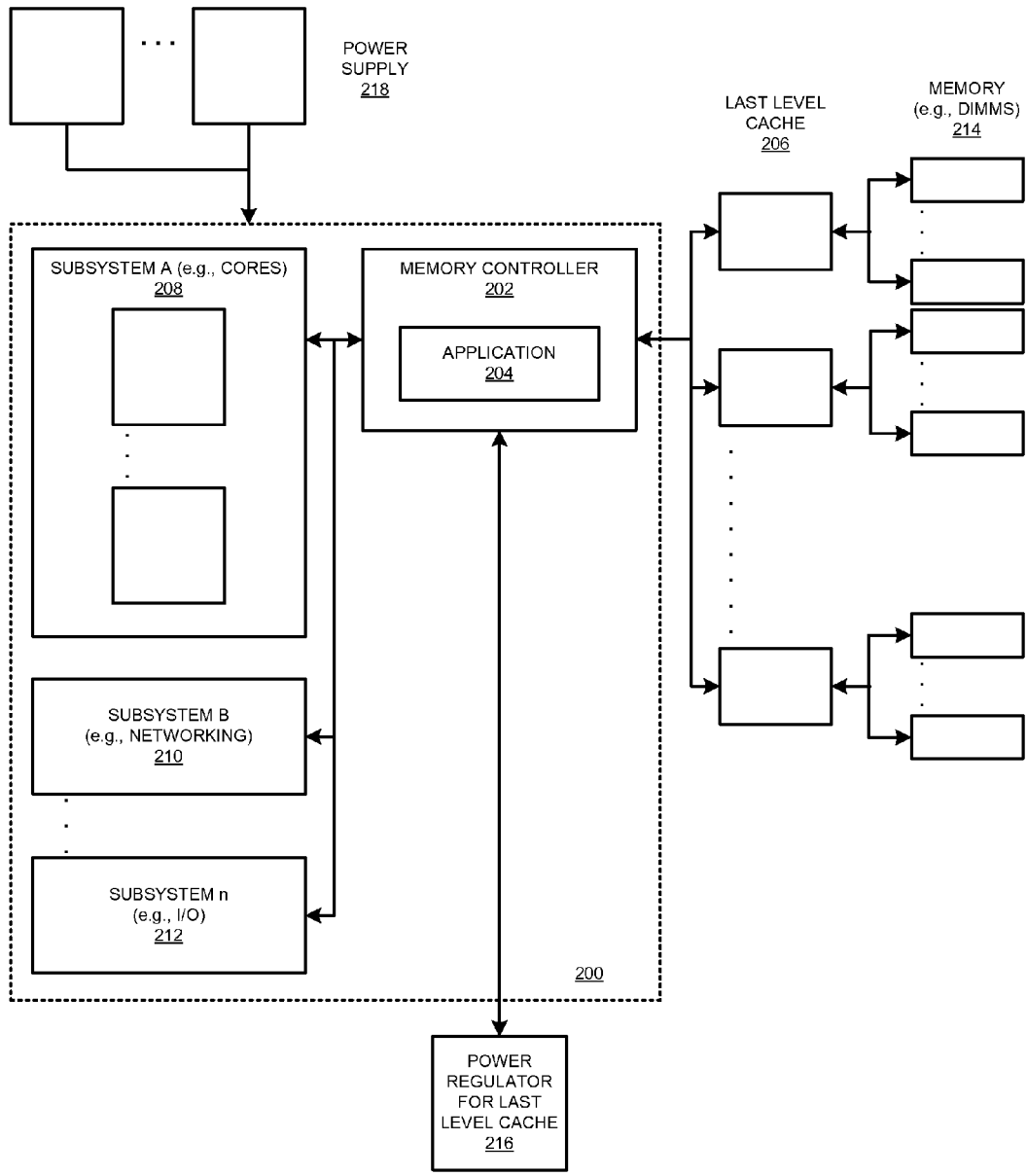
FIG. 2 depicts a block diagram of an example memory access configuration using a last level cache in accordance with an illustrative embodiment.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

With reference to FIG. 1, this figure depicts a block diagram of a data processing system in which the illustrative embodiments may be implemented. Data processing system 100 may be a symmetric multiprocessor (SMP) system including a plurality of processors 101, 102, 103, and 104, which connect to system bus 106. For example, data processing system 100 may be an IBM Power System® implemented as a server within a network. (IBM and Power Systems are trademarks of International Business Machines Corporation in the United States and other countries). Alternatively, a single processor system may be employed and processors 101, 102, 103, and 104 may be cores in the single processor chip. Alternatively, data processing system 100 may include processors 101, 102, 103, 104 in any combination of processors and cores.

Also connected to system bus 106 is memory controller/cache 108, which provides an interface to a plurality of local memories 160-163. I/O bus bridge 110 connects to system bus 106 and provides an interface to I/O bus 112. Memory controller/cache 108 and I/O bus bridge 110 may be integrated as depicted. Last level cache 108A is implemented within or in conjunction with memory controller/cache 108. Memories 160-163 form the memory that is accessed through last level cache 108A.

Data processing system 100 is a logically partitioned data processing system. Thus, data processing system 100 may have multiple heterogeneous operating systems (or multiple instances of a single operating system) running simultaneously. Each of these multiple operating systems may have any number of software programs executing within it. Data processing system 100 is logically partitioned such that different PCI I/O adapters 120-121, 128-129, and 136, graphics adapter 148, and hard disk adapter 149 may be assigned to different logical partitions. In this case, graphics adapter 148 connects to a display device (not shown), while hard disk adapter 149 connects to and controls hard disk 150.

Thus, for example, suppose data processing system 100 is divided into three logical partitions, P1, P2, and P3. Each of PCI I/O adapters 120-121, 128-129, 136, graphics adapter 148, hard disk adapter 149, each of host processors 101-104, and memory from local memories 160-163 is assigned to one of the three partitions. In these examples, memories 160-163 may take the form of dual inline memory modules (DIMMs). DIMMs are not normally assigned on a per DIMM basis to partitions. Instead, a partition will get a portion of the overall memory seen by the platform. For example, processor 101, some portion of memory from local memories 160-163, and I/O adapters 120, 128, and 129 may be assigned to logical partition P1; processors 102-103, some portion of memory from local memories 160-163, and PCI I/O adapters 121 and 136 may be assigned to partition P2; and processor 104, some portion of memory from local memories 160-163, graphics adapter 148 and hard disk adapter 149 may be assigned to logical partition P3.

Each operating system executing within data processing system 100 is assigned to a different logical partition. Thus, each operating system executing within data processing system 100 may access only those I/O units that are within its logical partition. Thus, for example, one instance of the Advanced Interactive Executive (AIM operating system may be executing within partition P1, a second instance (image) of the AIX operating system may be executing within partition P2, and a Linux® or IBM-i® operating system may be operating within logical partition P3. (AIX and IBM-i are trademarks of International business Machines Corporation in the United States and other countries. Linux is a trademark of Linus Torvalds in the United States and other countries).

Peripheral component interconnect (PCI) host bridge 114 connected to I/O bus 112 provides an interface to PCI local bus 115. A number of PCI input/output adapters 120-121 connect to PCI local bus 115 through PCI-to-PCI bridge 116, PCI bus 118, PCI bus 119, I/O slot 170, and I/O slot 171. PCI-to-PCI bridge 116 provides an interface to PCI bus 118 and PCI bus 119. PCI I/O adapters 120 and 121 are placed into I/O slots 170 and 171, respectively. Typical PCI bus implementations support between four and eight I/O adapters (i.e. expansion slots for add-in connectors). Each PCI I/O adapter 120-121 provides an interface between data processing system 100 and input/output devices such as, for example, other network computers, which are clients to data processing system 100.

An additional PCI host bridge 122 provides an interface for an additional PCI local bus 123. PCI local bus 123 connects to a plurality of PCI I/O adapters 128-129. PCI I/O adapters 128-129 connect to PCI local bus 123 through PCI-to-PCI bridge 124, PCI bus 126, PCI bus 127, I/O slot 172, and I/O slot 173. PCI-to-PCI bridge 124 provides an interface to PCI bus 126 and PCI bus 127. PCI I/O adapters 128 and 129 are placed into I/O slots 172 and 173, respectively. In this manner, additional I/O devices, such as, for example, modems or network adapters may be supported through each of PCI I/O adapters 128-129. Consequently, data processing system 100 allows connections to multiple network computers.

Memory mapped graphics adapter 148 is inserted into I/O slot 174 and connects to I/O bus 112 through PCI bus 144, PCI-to-PCI bridge 142, PCI local bus 141, and PCI host bridge 140. Hard disk adapter 149 may be placed into I/O slot 175, which connects to PCI bus 145. In turn, PCI bus 145 connects to PCI-to-PCI bridge 142, which connects to PCI host bridge 140 by PCI local bus 141.

A PCI host bridge 130 provides an interface for a PCI local bus 131 to connect to I/O bus 112. PCI I/O adapter 136 connects to I/O slot 176, which connects to PCI-to-PCI bridge 132 by PCI bus 133. PCI-to-PCI bridge 132 connects to PCI local bus 131. PCI local bus 131 also connects PCI host bridge 130 to service processor mailbox interface and ISA bus access pass-through logic 194 and PCI-to-PCI bridge 132.

Service processor mailbox interface and ISA bus access pass-through logic 194 forwards PCI accesses destined to PCI/ISA bridge 193. NVRAM storage 192 connects to ISA bus 196. Service processor 135 connects to service processor mailbox interface and ISA bus access pass-through logic 194 through its local PCI bus 195. Service processor 135 also connects to processors 101-104 via a plurality of JTAG/I2C busses 134. JTAG/I2C busses 134 are a combination of JTAG/scan busses (see IEEE 1149.1) and Phillips I2C busses.

However, alternatively, JTAG/I2C busses 134 may be replaced by only Phillips I2C busses or only JTAG/scan busses. All SP-ATTN signals of the host processors 101, 102, 103, and 104 connect together to an interrupt input signal of service processor 135. Service processor 135 has its own local memory 191 and has access to hardware OP-panel 190.

When data processing system 100 is initially powered up, service processor 135 uses the JTAG/I2C busses 134 to interrogate the system (host) processors 101-104, memory controller/cache 108, and I/O bridge 110. At the completion of this step, service processor 135 has an inventory and topology understanding of data processing system 100. Service processor 135 also executes Built-In-Self-Tests (BISTs), Basic Assurance Tests (BATs), and memory tests on all elements found by interrogating the host processors 101-104, memory controller/cache 108, and I/O bridge 110. Service processor 135 gathers and reports any error information for failures detected during the BISTs, BATs, and memory tests.

If a meaningful/valid configuration of system resources is still possible after taking out the elements found to be faulty during the BISTs, BATs, and memory tests, then data processing system 100 is allowed to proceed to load executable code into local (host) memories 160-163. Service processor 135 then releases host processors 101-104 for execution of the code loaded into local memory 160-163. While host processors 101-104 are executing code from respective operating systems within data processing system 100, service processor 135 enters a mode of monitoring and reporting errors. Service processor 135 monitors types of items including, for example, the cooling fan speed and operation, thermal sensors, power supply regulators, and recoverable and non-recoverable errors reported by processors 101-104, local memories 160-163, and I/O bridge 110.

Service processor 135 saves and reports error information related to all the monitored items in data processing system 100. Service processor 135 also takes action based on the type of errors and defined thresholds. For example, service processor 135 may take note of excessive recoverable errors on a processor's cache memory and decide that this is predictive of a hard failure. Based on this determination, service processor 135 may mark that resource for deconfiguration during the current running session and future Initial Program Loads (IPLs). IPLs are also sometimes referred to as a "boot" or "bootstrap."

Data processing system 100 may be implemented using various commercially available computer systems. For example, data processing system 100 may be implemented using IBM Power Systems available from International Business Machines Corporation. Such a system may support logical partitioning using an AIX operating system, which is also available from International Business Machines Corporation.

Memories, such as memory 191, NVRAM 192, local memories 160, 161, 162, and 163, or flash memory (not shown), are some examples of computer usable storage devices. Hard disk 150, a CD-ROM (not shown), and other similarly usable devices are some examples of computer usable storage devices including computer usable storage medium.

Those of ordinary skill in the art will appreciate that the hardware depicted in FIG. 1 may vary. For example, other peripheral devices, such as optical disk drives and the like, also may be used in addition to or in place of the hardware depicted. As another example, some physical resources, such as adapters, can be virtualized into corresponding virtual resources (not shown), and the virtual resources can then be allocated to the various partitions. As another example, the hardware depicted in FIG. 1 can be configured to use one or more virtual I/O server (VIOS) (not shown). The VIOS allows the sharing of physical resources, such as adapters, disks, controllers, processors, memories, and the like, between the supported logical partitions. Among other functions, between partitions, a shared VIOS helps reduce the need for large amounts of cabling, and perform live migration. The depicted example is not meant to imply architectural limitations with respect to the illustrative embodiments.

With reference to FIG. 2, this figure depicts a block diagram of an example memory access configuration using a last level cache in accordance with an illustrative embodiment. Memory controller 202 is an improved embodiment of memory controller 108 in FIG. 1. System 200 Memory controller 202 uses internally or externally implemented application 204, which implements an embodiment described herein. Last level cache 206 is an example of last level cache 108A in FIG. 1.

System 200 includes several subsystems. For example, subsystem-A 208 comprises one or more processor cores. As another example, subsystem-B 210 comprises networking components. As another example, subsystem-C 212 comprises I/O components. Any number and types of subsystems can similarly exist in a given data processing system without limitation.

The subsystems of system 200, such as subsystems 208, 210, and 212, utilize memory controller 202 to access memory 214 via last level cache 206. Additional memory controllers and applications may exist to connect to other last level caches and DIMMs connected to them in a given system. The example embodiment reflects just a single memory controller only as an example without implying a limitation thereto. Any number of memory controllers can be employed within the scope of the illustrative embodiments. Without implying a limitation thereto, the main memory in a presently available data processing system is an example of memory 214. Memory 214 comprises one or more memory devices. As an example, in one example configuration, last level cache 206 comprises eight enhanced dynamic random access memory (eDRAM) devices, each with 16 MB capacity. An eDRAM is much faster than a DIMM and is often used in cache configurations at various cache levels.

One unit or device in last level cache 206 corresponds or maps to eight DIMMs in memory 214, each of size 1 GB or more. The example configuration is not intended to be limiting on the illustrative embodiments. Any number of memory devices in last level cache 206 and memory 214 of any suitable capacity or type can be used in any suitable mapping configuration for a particular implementation within the scope of the illustrative embodiments.

Power regulator 216 provides power to last level cache 206. Power supply 218 comprises one or more power supply units to supply power to system 200. Memory controller 202 controls the operation of power regulator 216 for the desired state of operation of last level cache 206. In one embodiment, power regulator 216 provides power to last level cache 206 in such a manner that powering down power regulator 216 when last level cache 206 is powered down does not affect the power supply to other components in system 200.

Figure 3:
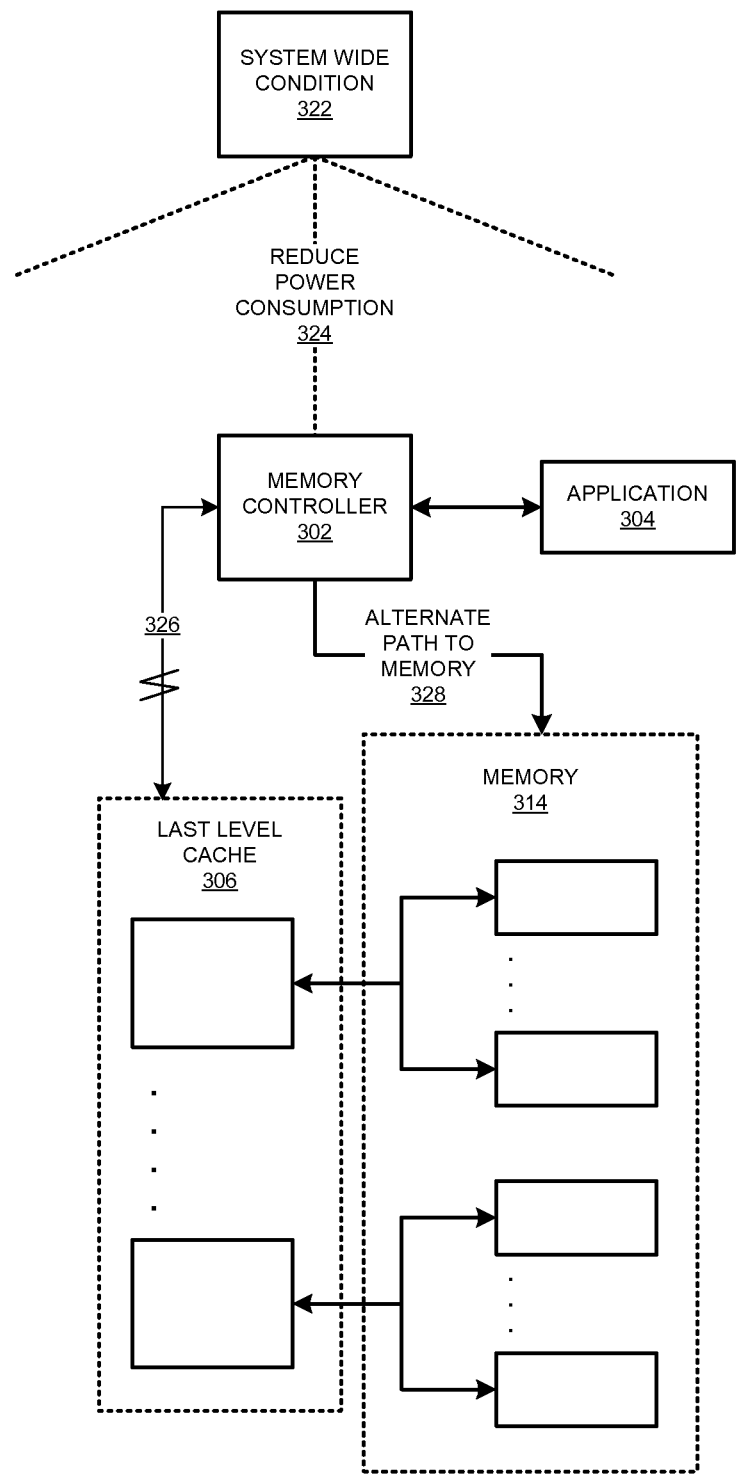
FIG. 3 depicts an example configuration of memory access for system-wide power conservation using memory cache in accordance with an illustrative embodiment.

With reference to FIG. 3, this figure depicts an example configuration of memory access for system-wide power conservation using memory cache in accordance with an illustrative embodiment. Memory controller 302 is an example of memory controller 202 in FIG. 2. Application 304 is an example of application 204 in FIG. 2 and implements another embodiment described herein. Last level cache 306 is an example of last level cache 206 in FIG. 2. Memory 314 is an example of memory 214 in FIG. 2.

In one embodiment, application 304 is implemented in firmware. In another embodiment, application 304 is implemented in software. In yet another embodiment, application 304 is a hardware state machine.

System-wide condition 322 is a condition indicative of a system-wide need for power consumption reduction. Condition 322 can be broadcast to components or subsystems in a data processing system, or can be detected by the components or subsystems. In one embodiment, memory controller detects condition 322 as indication 324 to reduce power consumption. In another embodiment, memory controller 302 receives indication 324 in the form of a message from another component in the data processing system to reduce the power consumption of the memory configuration.

Responsive to indication 324, memory controller 302 powers down last level cache 306 according to an embodiment. Memory controller 302 closes path 326 for processing memory requests via last level cache 306. Memory controller 302 processes the requests using alternate path 328 to memory 314 according to an embodiment. Operating in this manner, the memory requests continue to be processed without disruption, only some requests for memory access experience a temporary delay in being serviced due to the time needed to safely power down the last level cache as described elsewhere in this disclosure. In one example implementation, this delay was observed to be of the order of a few milliseconds, e.g., less than 10 milliseconds.

Figure 4:
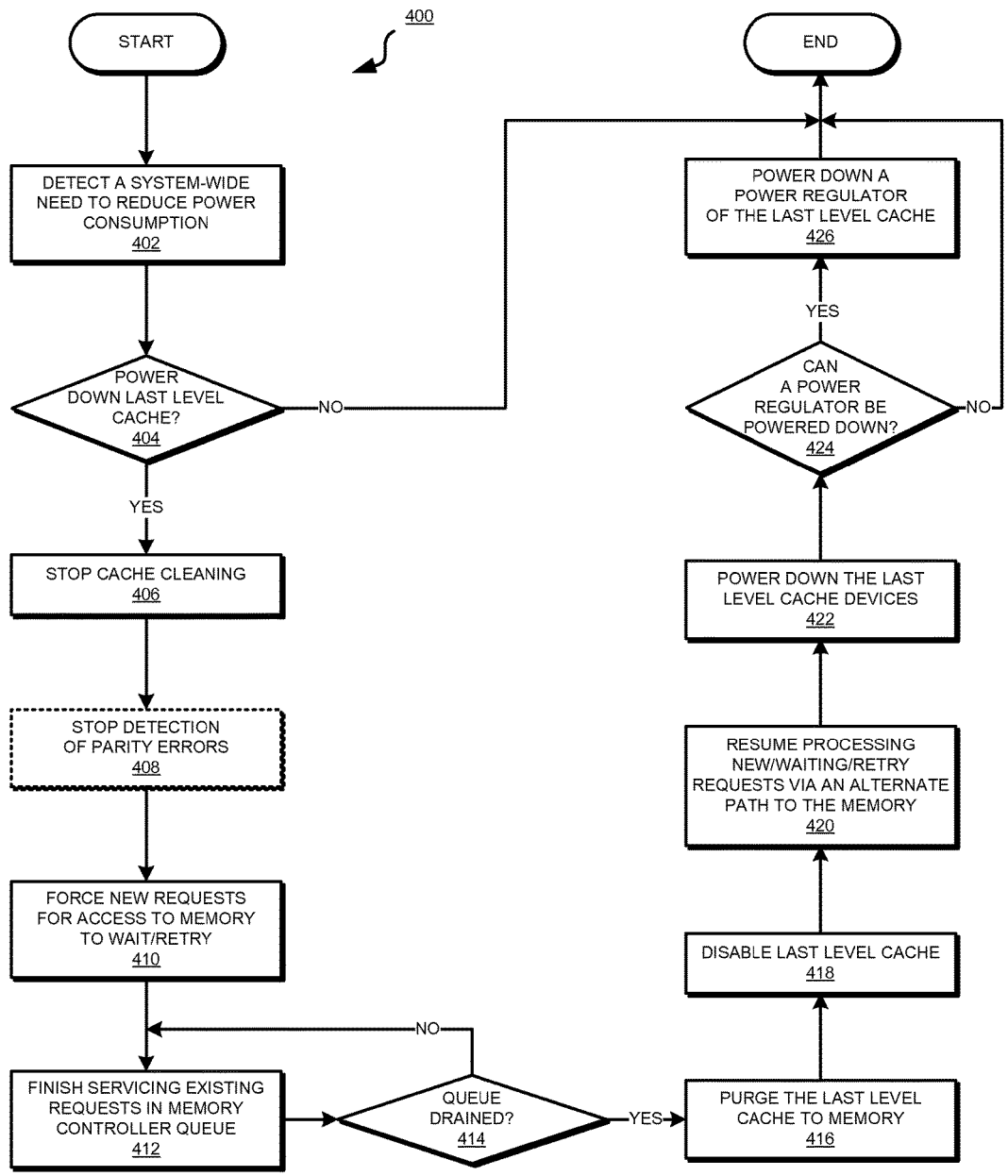
FIG. 4 depicts a flowchart of an example process of system-wide power conservation using memory cache in accordance with an illustrative embodiment.

With reference to FIG. 4, this figure depicts a flowchart of an example process of system-wide power conservation using memory cache in accordance with an illustrative embodiment. Process 400 is described with respect to an implementation in application 304 of FIG. 3 only as an example and without implying any limitation to such an implementation. Process 400 can similarly be implemented in memory controller 302, application 304, or a combination thereof in FIG. 3 within the scope of the illustrative embodiments.

An application, such as application 304 in FIG. 3, begins process 400 by detecting a system-wide need to reduce power consumption (block 402). The application determines whether the detection in block 402 warrants powering down the last level cache, such as last level cache 306 in FIG. 3 (block 404). For example, in one embodiment, different indications of the need for power consumption reduction may be distinguishable from one another, and powering down the last level cache may be needed only in response to some such indications. As another example, under certain circumstances, the last level cache may already be powered down in response to detecting a previous indication, and another indication may be detected in block 402. If the last level cache cannot or should not be powered down ("No" path of block 404), the application ends process 400.

If the last level cache has to be powered down ("Yes" path of block 404), the application stops a cache cleaning service that operates on the last level cache, such as to optimize the last level cache, remove unused data and make the corresponding portion of the cache available, and to perform other similar functions (block 406). Optionally, or as needed, the application may also stop a parity error detection service, such as by clearing certain bit-flags associated with the last level cache (block 408).

The application forces new requests for memory access to wait, such as by causing a newly arriving request to be retried after a period (block 410). In one embodiment, a memory access request is considered new if the request is not already in a queue of requests that are to be processed using the last level cache at the time of step 404. In one embodiment, the memory controller, such as memory controller 302 in FIG. 3 maintains one or more such queues.

The application causes the servicing of the requests already in such queues to be completed, such as by instructing the memory controller to process the already queued requests (block 412). The application checks whether all queues holding memory access requests have been drained, to wit, no queued request remains incomplete (block 414). If one or more requests are awaiting service on one or more queues ("No" path of block 414), the application returns to block 412.

If all queues holding memory access requests are drained, and no requests are pending in those queues ("Yes" path of block 414), the application causes the last level cache to be purged to memory, such as by instructing the memory controller to purge the last level cache to memory (block 416). The application causes the last level cache to be disabled, such as by instructing the memory controller to disable further use of the last level cache (block 418).

The application instructs the memory controller to resume the processing of the new requests, whether just arriving, or waiting or retrying as a result of block 410 (block 420). The memory controller resumes the processing by using an alternate path to the memory, such as path 328 in FIG. 3.

With the last level cache adequately fenced off from any participation in any new memory access requests, and without having disrupted any previous memory access requests, the last level cache can now be powered down in a non-disruptive way to conserve power in the system. Accordingly, the application causes the last level cache to be powered down, such as by instructing the memory controller to power down one, some, or all the devices used in the last level cache (block 422).

In one embodiment, the application ends process 400 thereafter. In another embodiment, the application further determines whether a power regulator supplying power to the last level cache can also be powered down for additional power savings (block 424). If the power regulator cannot be powered down, such as when the power regulator is supplying power to another active component ("No" path of block 424), the application ends process 400.

If the power regulator can be powered down, such as when the power regulator was only providing power to the last level cache that has been powered down ("Yes" path of block 424), the application causes the power regulator to be powered down as well, such as by instructing the memory controller to power down the power regulator (block 426). The application ends process 400 thereafter.

With reference to FIG. 5, this figure depicts a flowchart of an example process of returning a powered-down last level cache back to service in accordance with an illustrative embodiment. Process 500 is described with respect to an implementation in application 304 of FIG. 3 only as an example and without implying any limitation to such an implementation. Process 500 can similarly be implemented in memory controller 302, application 304, or a combination thereof in FIG. 3 within the scope of the illustrative embodiments.

An application, such as application 304 in FIG. 3, begins process 500 by detecting an absence of a system-wide need to reduce power consumption (block 502). The application determines whether a last level cache, such as last level cache 306 in FIG. 3, is presently in powered-down mode (block 504). If the last level cache has not been powered down ("No" path of block 504), the application ends process 500.

If the last level cache has been powered down ("Yes" path of block 504), the application powers up one, some, or all the devices used in the last level cache (block 506). The application determines whether all devices used in the last level cache are ready (block 508). For example, some devices presently used as caching devices use a charge pumping mechanism before they are ready for use. In such an example case, block 508 ensures that the charge pump operation has completed. If the devices are not ready "No" path of block 508), the application returns to block 506.

If the devices are ready ("Yes" path of block 508), the application forces new requests for memory access to wait, such as by causing a newly arriving request to be retried after a period (block 510). In one embodiment, a memory access request is considered new if the request is not already in a queue of requests to be processed using the alternate path without using the last level cache at the time of step 504. In one embodiment, the memory controller, such as memory controller 302 in FIG. 3 maintains one or more such queues.

The application causes the servicing of the requests already in such queues to be completed, such as by instructing the memory controller to process the already queued requests (block 512). The application checks whether all queues holding memory access requests have been drained, to wit, no queued request remains incomplete (block 514). If one or more requests are awaiting service on one or more queues ("No" path of block 514), the application returns to block 512.

If all queues holding memory access requests are drained, and no requests are pending in those queues ("Yes" path of block 514), the application causes the last level cache devices to be configured for use as the last level cache (block 516). The application causes, such as by instructing the memory controller to do so, the known cache line deletes to be restored from a saved history of cache errors (block 518).

A history of cache errors is a collection of errors encountered in the last level cache devices over a period of prior operation, such as up to the point in time when the last level cache devices were powered down. For example, if a cosmic ray burst caused a bit flip in a particular memory portion in the last level cache device resulting in an error condition, that error and the corresponding portion is noted in the history. The portion is called a cache line. In some configurations, such as in high-reliability environments, cache lines where errors have been observed at some point in time are marked as not to be used (marked as delete), and are recorded in the history. When the memory device is intentionally powered down or accidentally suffers a power outage, the device is powered up and known error-prone cache lines are re-marked as deletes based on the history, as in block 518.

The application enables the last level cache for use, such as by instructing the memory controller to allow enable a memory access pathway to the devices configured for use as the last level cache (block 520). The application instructs the memory controller to resume the processing of the new requests, whether just arriving, or waiting or retrying as a result of block 510, using the re-established memory access path through the last level cache (block 522). The memory controller resumes the processing by using the path to the memory via the last level cache, such as path 326 in FIG. 3.

The application also causes other operations or services to start with respect to the last level cache, for example by instructing the memory controller to begin parity error detection and cache cleaning services (block 524). The application ends process 500 thereafter.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Thus, a computer implemented method, system, and computer program product are provided in the illustrative embodiments for system-wide power conservation using memory cache. An embodiment provides a method for dynamically taking a last level cache offline and online, including powering the last level cache down or up, without disrupting memory access operations in a data processing system. An embodiment further allows the power regulator to be powered down or up together with the powering down or powering up of the last level cache for greater power savings.

In addition an embodiment can dynamically re-initialize a last level cache with full restoration of previous cache line deletes that occurred from previous correctable or uncorrectable errors, before the last level cache is used in the path to memory. Although the embodiments describe a manner of power saving regardless of any component or system utilization, an embodiment can be used in conjunction with changing utilization of the system. An embodiment can be used to power down the last level cache upon detection that an entire system entering a near idle state (below threshold utilization) where a core is still active and utilizing the last level cache. Likewise, an embodiment can be used to bring the last level cache back on line when the utilization increases above the threshold, and the system exits the near idle state.

An embodiment can also be used to manage power failures in the system. For example, an embodiment can be used to power down the cache upon detection of a power fault in the system, and to bring the cache back on line when the power fault is resolved.

An embodiment can also be used to manage thermal conditions in the memory configuration of a system. For example, an embodiment can be used to power down the cache upon detection of higher than threshold temperatures inside a last level cache device that could harm the device. An embodiment can be used to bring the last level cache back on line when the temperature subsides below the threshold.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable storage device(s) or computer readable media having computer readable program code embodied thereon.

Any combination of one or more computer readable storage device(s) or computer readable media may be utilized. The computer readable medium may be a computer readable signal medium or a computer readable storage medium. A computer readable storage device may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage device would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage device may be any tangible device or medium that can contain, or store a program for use by or in connection with an instruction execution system, apparatus, or device.

Program code embodied on a computer readable storage device or computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to one or more processors of one or more general purpose computers, special purpose computers, or other programmable data processing apparatuses to produce a machine, such that the instructions, which execute via the one or more processors of the computers or other programmable data processing apparatuses, create means for implementing the functions/acts specified in the flowchart and/or block diagram block or blocks.

These computer program instructions may also be stored in one or more computer readable storage devices or computer readable media that can direct one or more computers, one or more other programmable data processing apparatuses, or one or more other devices to function in a particular manner, such that the instructions stored in the one or more computer readable storage devices or computer readable medium produce an article of manufacture including instructions which implement the function/act specified in the flowchart and/or block diagram block or blocks.

The computer program instructions may also be loaded onto one or more computers, one or more other programmable data processing apparatuses, or one or more other devices to cause a series of operational steps to be performed on the one or more computers, one or more other programmable data processing apparatuses, or one or more other devices to produce a computer implemented process such that the instructions which execute on the one or more computers, one or more other programmable data processing apparatuses, or one or more other devices provide processes for implementing the functions/acts specified in the flowchart and/or block diagram block or blocks.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

What is claimed is:

1. A method for system-wide power conservation using memory cache, the method comprising:
    receiving a memory access request at a location in a memory architecture of a data processing system where processing the memory access request has to use a last level of cache before reaching a memory device holding a requested data, wherein a cache device is used as the last level of cache;
    causing, using a memory controller, the memory access request to wait, and omitting adding the memory access request to a queue of existing memory access requests accepted for processing using the last level of cache;
    processing all the existing memory access requests in the queue using the last level of cache;
    purging the last level of cache to the memory device;
    marking a portion of the cache device such that the portion cannot be used to store data in the cache device;
    processing the memory access request using an alternative path to the memory device that avoids the last level of cache; and
    powering down the cache device.

2. The method of claim 1, further comprising:
    detecting a condition in the data processing system, wherein the condition is indicative of a system-wide need of reducing a power consumption of the data processing system, and wherein the causing is responsive to the detecting.

3. The method of claim 1, further comprising:
    stopping a cache cleaning service operating on the last level of cache; and
    stopping a detection of parity errors in the last level of cache.

4. The method of claim 1, wherein the causing the memory access request to wait causes a retry of the memory access request.

5. The method of claim 1, wherein all existing memory access requests and the memory access request are processed without disrupting an operation in the data processing system and regardless of a utilization of a component of the data processing system.

6. The method of claim 1, further comprising:
    powering down a regulator that supplies power to the cache device used as the last level of cache.

7. The method of claim 1, further comprising:
    receiving a new memory access request at the location in a memory architecture of a data processing system where processing the memory access request has to use the last level of cache before reaching the memory device holding another requested data;
    causing the new memory access request to wait, and omitting adding the memory access request to the queue of existing memory access requests accepted for processing using the alternative path;
    processing all the existing memory access requests in the queue using the alternative path;
    powering up the cache device;

configuring, forming a configured cache device, the cache device to operate as the last level of cache;

processing the new memory access request using the last level of cache.

8. The method of claim 1, further comprising:

reading a record from a historic information, wherein the record indicates an error in the portion at a time prior to receiving the new memory access request.

9. A computer usable program product comprising a computer usable storage device including computer usable code for system-wide power conservation using memory cache, the computer usable code comprising:

computer usable code for receiving a memory access request at a location in a memory architecture of a data processing system where processing the memory access request has to use a last level of cache before reaching a memory device holding a requested data, wherein a cache device is used as the last level of cache;

computer usable code for causing, using a memory controller, the memory access request to wait, and omitting adding the memory access request to a queue of existing memory access requests accepted for processing using the last level of cache;

computer usable code for processing all the existing memory access requests in the queue using the last level of cache;

computer usable code for purging the last level of cache to the memory device;

computer usable code for marking a portion of the cache device such that the portion cannot be used to store data in the cache device;

computer usable code for processing the memory access request using an alternative path to the memory device that avoids the last level of cache; and computer usable code for powering down the cache device.

10. The computer usable program product of claim 9, further comprising:

computer usable code for detecting a condition in the data processing system, wherein the condition is indicative of a system-wide need of reducing a power consumption of the data processing system, and wherein the causing is responsive to the detecting.

11. The computer usable program product of claim 9, further comprising:

computer usable code for stopping a cache cleaning service operating on the last level of cache; and computer usable code for stopping a detection of parity errors in the last level of cache.

12. The computer usable program product of claim 9, wherein the causing the memory access request to wait causes a retry of the memory access request.

13. The computer usable program product of claim 9, wherein all existing memory access requests and the memory access request are processed without disrupting an operation in the data processing system and regardless of a utilization of a component of the data processing system.

14. The computer usable program product of claim 9, further comprising:

computer usable code for powering down a regulator that supplies power to the cache device used as the last level of cache.

15. The computer usable program product of claim 9, further comprising:

computer usable code for receiving a new memory access request at the location in a memory architecture of a data processing system where processing the memory access request has to use the last level of cache before reaching the memory device holding another requested data;

computer usable code for causing the new memory access request to wait, and omitting adding the memory access request to the queue of existing memory access requests accepted for processing using the alternative path;

computer usable code for processing all the existing memory access requests in the queue using the alternative path;

computer usable code for powering up the cache device;

computer usable code for configuring, forming a configured cache device, the cache device to operate as the last level of cache;

computer usable code for processing the new memory access request using the last level of cache.

16. The computer usable program product of claim 9, wherein the computer usable code is stored in a computer readable storage medium in a data processing system, and wherein the computer usable code is transferred over a network from a remote data processing system.

17. The computer usable program product of claim 9, wherein the computer usable code is stored in a computer readable storage medium in a server data processing system, and wherein the computer usable code is downloaded over a network to a remote data processing system for use in a computer readable storage medium associated with the remote data processing system.

18. A data processing system for system-wide power conservation using memory cache, the data processing system comprising:

a storage device including a storage medium, wherein the storage device stores computer usable program code; and a processor, wherein the processor executes the computer usable program code, and wherein the computer usable program code comprises:

computer usable code for receiving a memory access request at a location in a memory architecture of a data processing system where processing the memory access request has to use a last level of cache before reaching a memory device holding a requested data, wherein a cache device is used as the last level of cache;

computer usable code for causing, using a memory controller, the memory access request to wait, and omitting adding the memory access request to a queue of existing memory access requests accepted for processing using the last level of cache;

computer usable code for processing all the existing memory access requests in the queue using the last level of cache;

computer usable code for purging the last level of cache to the memory device;

computer usable code for marking a portion of the cache device such that the portion cannot be used to store data in the cache device;

computer usable code for processing the memory access request using an alternative path to the memory device that avoids the last level of cache; and computer usable code for powering down the cache device.

19. The computer usable program product of claim 9, further comprising:

computer usable code for reading a record from a historic information, wherein the record indicates an error in the portion at a time prior to receiving the new memory access request.

* * * * *